(12) United States Patent
Cochran et al.

(10) Patent No.: US 7,705,724 B2
(45) Date of Patent: Apr. 27, 2010

(54) AUGMENTED SECURITY SYSTEM

(75) Inventors: Edward L. Cochran, Minneapolis, MN (US); Bruce W. Anderson, Andover, MN (US); Rand P. Whillock, North Oaks, MN (US)

(73) Assignee: Honeywell International Inc., Morristown, NJ (US)

( * ) Notice: Subject to any disclaimer, the term of this patent is extended or adjusted under 35 U.S.C. 154(b) by 329 days.

(21) Appl. No.: 11/881,045

(22) Filed: Jul. 25, 2007

(65) Prior Publication Data

US 2009/0027195 A1    Jan. 29, 2009

(51) Int. Cl.
*G08B 19/00* (2006.01)
(52) U.S. Cl. ............... 340/522; 340/523; 340/517
(58) Field of Classification Search ........ 340/500, 340/501, 506, 517, 522, 523, 541, 545.2, 340/565, 426.24, 933, 602; 324/457, 72
See application file for complete search history.

(56) References Cited

U.S. PATENT DOCUMENTS

| | | | |
|---|---|---|---|
| 5,764,143 A * | 6/1998 | Buccola | 340/521 |
| 6,922,059 B2 * | 7/2005 | Zank et al. | 324/457 |
| 7,126,476 B2 * | 10/2006 | Alkelai et al. | 340/565 |
| 2003/0090371 A1 * | 5/2003 | Teowee et al. | 340/426.24 |
| 2007/0152846 A1 * | 7/2007 | Tonelli et al. | 340/933 |

* cited by examiner

*Primary Examiner*—Van T. Trieu
(74) *Attorney, Agent, or Firm*—Kris T. Fredrick; Kermit D. Lopez; Luis M. Ortiz

(57) ABSTRACT

A system for augmenting security sensor accuracy and reduction of false alarm signals. The system includes the security sensor system along with an external sensor system for measuring the effect of environmental conditions on the security sensors and further includes a sensor data augmentation component to adjust the sensitivity of the security sensors according to measured environmental conditions. Weather sensors and video sensors are two preferred external sensor systems.

18 Claims, 2 Drawing Sheets

AUGMENTED SECURITY SYSTEM

FIELD OF THE INVENTION

The present invention relates to security systems. More particularly, the invention relates to such systems where the data collected by a security system is augmented by additional data from, for example, weather stations and video observations.

BACKGROUND OF THE INVENTION

Security systems can be significantly adversely impacted by rain, snow, sleet, wind, and extreme temperatures. To function properly, security systems depend on high sensitivity and low false alarm rates, but external factors such as weather and time of day can, in some cases, have significant effects. For example, passive infrared sensors need to be less sensitive when the scene is snow covered, to avoid generating false alarms due to the movement of small animals. Similarly, fence motion sensors need to be less sensitive on windy days. In the absence of video surveillance, security system operators can not easily determine if an alarm is valid or false, necessitating that every alarm be investigated. As a result, security systems are often de-tuned and operate at less than maximum detection capability in order to minimize the false alarm rate. Some types of security systems record data over a period of time to learn a baseline for "normal" sensor data and then generate alerts when readings are outside of the normal range. Changing weather situations require these types of systems to broaden the "normal" range to accommodate all weather conditions.

It would be of great advantage if a means could be provided to significantly reduce false alarms due to weather.

It would be another advantage in the art if additional data could be provided to security systems using existing surveillance cameras associated with the facility.

It would be another advantage if adaptive systems could take into account weather information in their baseline rather than having to broaden the baseline.

Yet another advantage would be if weather data, existing surveillance data and time of day could be coordinated to adjust or augment the normal security system to provide more reliable alarm data and significantly reduce false alarms.

Still another advantage would be if a system for augmenting security systems could be developed that would increase reliability without adding significant costs to the systems being augmented.

Other advantages will appear hereinafter.

SUMMARY OF THE INVENTION

It has now been discovered that the above and other advantages of the present invention may be obtained in the following manner. Specifically, the present invention provides a system and method for augmenting security sensors. The system and method includes at least one external sensor for sensing at least one environmental condition proximate said security sensors. The system and method also includes a sensor data augmentation unit for adjusting the sensitivity of said security sensors by the effect caused by said at least one environmental condition and adjusts the alarm output of said security sensor to reduce the probability of a false alarm.

In a preferred embodiment, the at least one external sensor is a weather sensor and more preferably a plurality of weather sensors sensing different weather conditions. The different weather conditions include temperature, wind speed, wind direction, rain rate and solar isolation.

In another preferred embodiment, the at least one external sensor is a video sensor, which preferably is adapted to video sensor is adapted to sense motion of objects, snow and rain, and time of day.

The use of both a weather sensor and a video sensor is also contemplated by the present invention.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
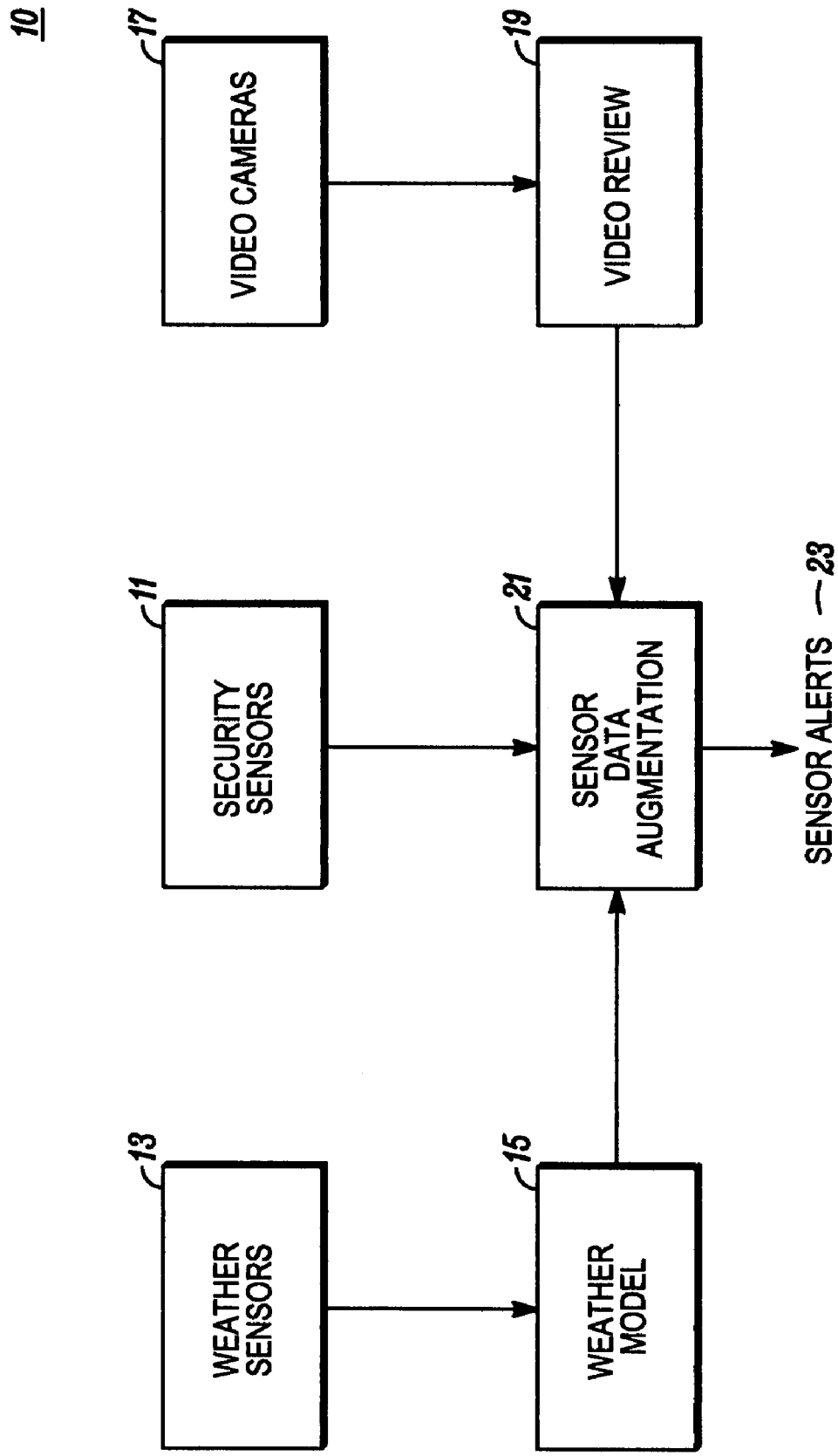
FIG. 1 is a block diagram of the preferred embodiment of the present invention.

The present invention operates as an augmentation to security systems by using normally available data from existing components to reduce the rate of false alarms. In FIG. 1, the system, 10 generally, has conventional security sensors 11 such as, by way of example, IR and RF detectors, seismic sensors, vibration and movement sensors, temperature sensors, and the like.

Date from the sensors 11 is transmitted to a sensor data augmentation unit 21. At the same time, weather sensors 13, such as wind speed sensors, thermometers, rain gauges, brightness sensors and the like, transmit data that is analyzed by a weather model 15, which in turn sends signals to the sensor data augmentation unit 21.

Similarly, video cameras 17, which normally exist in or at facilities needing security protection, transmit data to a video review unit 19 for processing, such as by observing movement of trees to determine the direction of the wind or by determining the amount of sun light in comparison to the time of day. Cloud cover may also be factored into the observations. This data is also provided to the sensor data augmentation unit 21, which can now determine if a sensor alert is to be ignored, because it is a natural event not caused by an attempt at breach of security, or send an alarm because the data does not coincide with what is to be expected under the observed conditions.

Of course it is contemplated that either weather sensors 13 or video cameras 17 will be used, and both can be used sequentially or simultaneously to increase the accuracy of the system.

Figure 2:
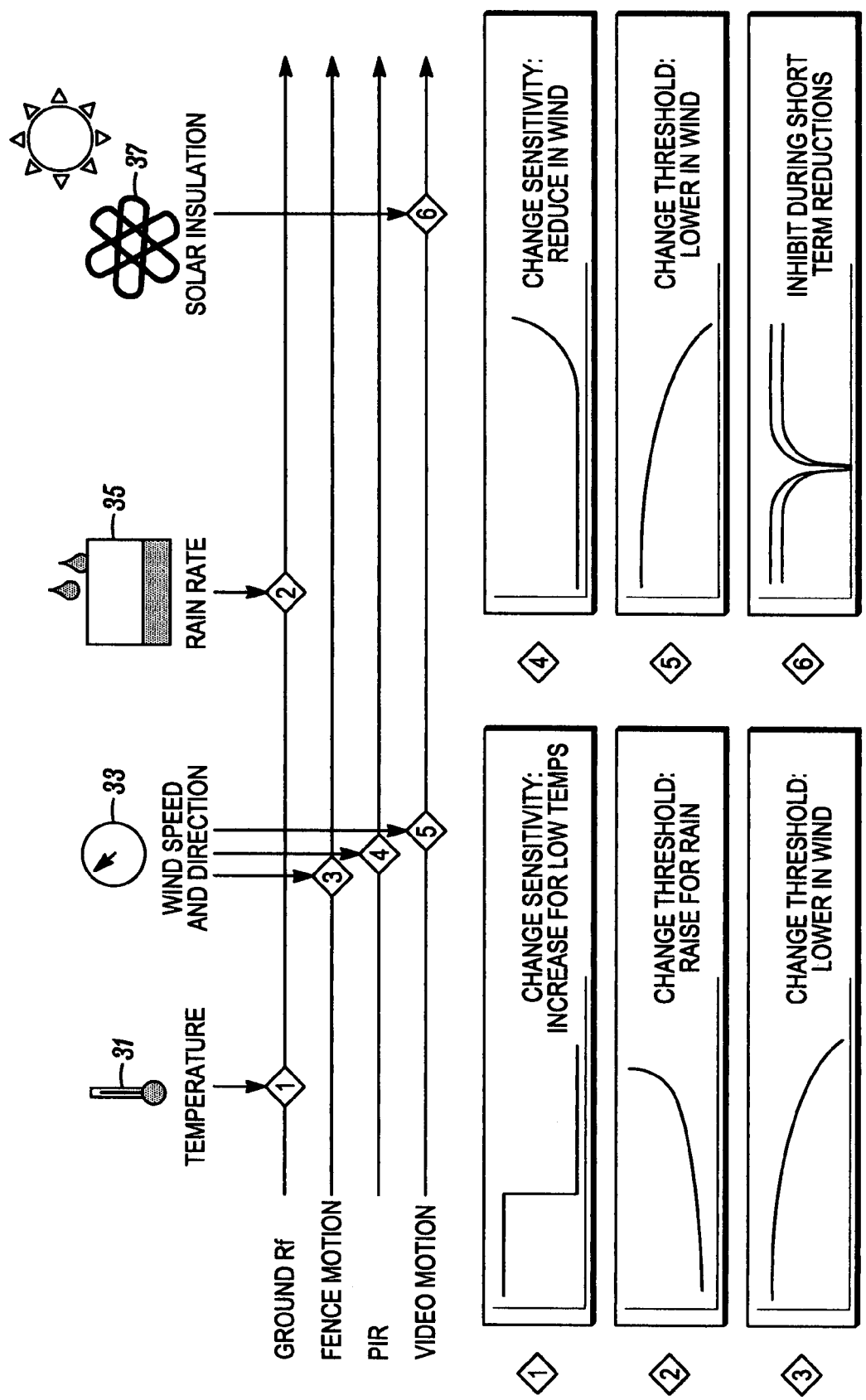
FIG. 2 is a schematic view of the system of FIG. 1 showing operation of the various data inputs.

In FIG. 2, various augmentations are shown as they affect the security system at a facility. Temperature sensor 31, wind speed and direction sensor 33, rain sensor 35 and solar isolation sensor 37 are used to augment various security sensors. Ground Rf is affected by both temperature and rain rate. Diamond 1 shows that the ground Rf sensor sensitivity is increased for low temperatures, while Diamond 2 indicates that the threshold for the Rf sensor is increased when rain is experienced.

The present invention is particularly effective in augmenting the response of fence motion sensors as they are affected by wind speed and direction. Diamond 3 illustrates that the threshold is lowered during higher winds. The augmentation can be even more effective for fence motion sensors. For example if the wind is seen (by wind speed sensor 33 or by a video camera observation of nearby trees) to be blowing in one direction an the fence moves in that direction, that movement can be subtracted from the sensor data to give a zero reading when only the wind is sensed. If an intruder causes the sensor to increase its reading above the zero reading, or if the sensor signals movement in a direction different from the wind direction, an alarm is sounded.

With PIR security sensors, wind speed and direction is also used to augment the sensor output in the same manner, seeking to measure a zero reading as noted above.

Similarly, wind speed and direction (again by sensor 33 or a video camera) will cause some objects and natural objects, such as trees, bushes, flags and banners, signs and the like, to move, causing the video sensor to send an alarm. If the sensor augmentation unit, 21 of FIG. 1, reduces the sensor signal to the zero reading because of sensor 33 or a video camera 17, other movement detected by video motion will send an alarm signal. When the solar isolation sensor 37 detects the passing of a cloud, or a break in otherwise full cloud cover, the video motion sensor can be inhibited during that brief interval, thus avoiding false alarm signals.

It has been found that by integrating information from video surveillance and time of day, data is obtained to aid in the prediction of false sensor alarms. Conventional motion detection algorithms can make use of the prediction information to automatically adjust for environmental conditions such as wind and snow cover.

Likewise, these motion detection algorithms can make use of weather predictions of false sensor alarms to automatically adjust for weather related-alarms such as camera pole moving or a fence sensor alarming due to wind, as described above. Software can also use weather information, weather history and calibration data to determine if an alarm is more or less likely to be a false alarm versus the result of an intrusion.

Incorporation of environmental data from either source, or both, enables a much more sensitive and capable security system while reducing false alarms.

There are essentially three aspects of this invention. In the first phase, when weather data is used, data is collected either from a local weather station, directly connected to the security system, or from nearby weather station information available via the internet. Relevant data include current absolute wind speed, variability of wind speed over time, current rainfall, recent rainfall, current temperature, snow cover, solar insulation, and time of day. The source of the data (on-site or nearby) is also considered. When video data is acquired, a set of dedicated software analyses assess video data for indications of wind, snow cover, and other relevant environmental data, combined with local time of day information. Wind can be detected by the presence of rhythmic motion of objects such as swaying trees (or by the motion of the whole field of view in the case of pole-mounted cameras). Snow cover can be detected by average brightness levels during daytime, compared to values recorded at other times of the year during daytime.

In the second phase, the weather data is re-assessed at intervals (the length of the interval depends on the configuration of the security system and the variability in the data). For each security system installation, a data structure is populated that relates the impact on each security system sensor of every weather variable. For example, rainfall increases the sensitivity of in-ground Rf intrusion systems, and wind decreases the sensitivity of on-fence Rf motion detection systems. For each sensor, the environmental parameters that affect the sensitivity of that sensor are identified at system installation time. These initial parameters can be further tuned manually or automatically as the system performs over the course of weeks and months. Similarly, the video data is assessed at periodically (the length of the interval depends on the configuration of the security system and the variability in the data). For each security system installation, a data structure is populated that relates the impact on each security system sensor of every relevant condition detected by the video system. For example, wind decreases the sensitivity of on-fence Rf motion detection systems, and snow cover increases the sensitivity of Passive Infrared detectors. For each sensor, the environmental parameters that affect the sensitivity of that sensor are identified at system installation time. These initial parameters can also be further tuned manually or automatically as the system performs over the course of weeks and months. the presence of an environmental condition (as detected through video analysis) that is relevant to a security sensor (as determined in the data structure) the security system tunes the sensor to be more or less sensitive, as appropriate, in order to either increase the likelihood of detection of the presence of an environmental condition (as detected through video analysis) that is relevant to a security sensor (as determined in the data structure) the security system tunes the sensor to be more or less sensitive, as appropriate, in order to either increase the likelihood of detection of a true intrusion or to decrease false alarms. a true intrusion or to decrease false alarms.

For the third phase of this invention system, if there is the presence of an environmental condition (as detected by the weather station) that is relevant to a security sensor (as determined in the data structure), the security system tunes the sensor to be more or less sensitive, as appropriate, in order to either increase the likelihood of detection of a true intrusion or to decrease false alarms. Likewise, if there is the presence of an environmental condition (as detected through video analysis) that is relevant to a security sensor (as determined in the data structure) the security system tunes the sensor to be more or less sensitive, as appropriate, in order to either increase the likelihood of detection of a true intrusion or to decrease false alarms.

It is contemplated that any external environmental sensor system can be used, alone or in combination with other sensors, to augment the effectiveness of security system sensors. For example, either weather sensors, video sensors, or both, can be used in accordance with the present invention.

While particular embodiments of the present invention have been illustrated and described, it is not intended to limit the invention, except as defined by the following claims.

The invention claimed is:

1. A system for augmenting security sensors, comprising:
   at least one external sensor for sensing at least one environmental condition proximate said security sensors and generating data indicative of said at least one environmental condition;
   a weather module for analyzing data associated with said at least one environmental condition and generated by said at least one external sensor;
   a sensor data augmentation unit for adjusting a sensitivity of said security sensors based on data provided by said weather module caused by said at least one environmental condition; and
   adjusting the alarm output of said security sensor to reduce the probability of a false alarm.

2. The device of claim 1, wherein said at least one external sensor is a weather sensor.

3. The device of claim 2, wherein said weather sensor includes a plurality of different types of weather sensors sensing different weather conditions.

4. The device of claim 3, wherein said different weather conditions include temperature, wind speed, wind direction, rain rate and solar isolation.

5. The device of claim 1, wherein said at least one external sensor is a video sensor having associated processing software and hardware.

6. The device of claim 5 wherein said video sensor is adapted to sense motion of objects, snow and rain, and time of day.

7. A system for augmenting security sensors, comprising:
at least one external sensor means for sensing at least one environmental condition proximate said security sensors;
a weather module means for analyzing data associated with said at least one environmental condition provided by said external sensor;
a sensor data augmentation means for adjusting the sensitivity of said security sensors based on the data provide by said weather module means caused by said at least one environmental condition; and
adjusting the alarm output of said security sensor to reduce the probability of a false alarm.

8. The device of claim 7, wherein said at least one external sensor means is a weather sensor means for sensing at least one weather condition.

9. The device of claim 8, wherein said weather sensor means includes a plurality of different types of weather sensors sensing different weather conditions.

10. The device of claim 9, wherein said different weather conditions include temperature, wind speed, wind direction, rain rate and solar isolation.

11. The device of claim 7, wherein said at least one external sensor means is a video sensor means having associated processing software and hardware for sensing at least one weather condition.

12. The device of claim 11 wherein said video sensor means is adapted to sense motion of objects, snow and rain, and time of day.

13. A method for augmenting security sensors, comprising the steps of:
providing at least one external sensor for sensing at least one environmental condition proximate said security sensors;
analyzing data from said external sensors with a weather module;
adjusting the sensitivity of said security sensors based on the data provide by said weather module caused by said at least one environmental condition with a sensor data augmentation unit; and
adjusting the alarm output of said security sensor to reduce the probability of a false alarm.

14. The method of claim 13, wherein said at least one external sensor is a weather sensor.

15. The method of claim 14, wherein said weather sensor includes a plurality of different types of weather sensors sensing different weather conditions.

16. The method of claim 15, wherein said different weather conditions include temperature, wind speed, wind direction, rain rate and solar isolation.

17. The method of claim 13, wherein said at least one external sensor is a video sensor having associated processing software and hardware.

18. The method of claim 17, wherein said video sensor is adapted to sense motion of objects, snow and rain, and time of day.

* * * * *